(12) United States Patent
Klarmann et al.

(10) Patent No.: US 11,363,034 B2
(45) Date of Patent: Jun. 14, 2022

(54) METHOD AND DEVICE FOR OPERATING A CONTROL UNIT IN A NETWORK OF CONTROL UNITS

(71) Applicant: Robert Bosch GmbH, Stuttgart (DE)

(72) Inventors: Juergen Klarmann, Waiblingen (DE); Claudia Loderhose, Tuebingen (DE); Franziska Wiemer, Pleidelsheim (DE); Joachim Graf, Gueglingen (DE); Johann Kobelski, Erlenbach (DE); Simon Greiner, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 16/823,747

(22) Filed: Mar. 19, 2020

(65) Prior Publication Data
US 2020/0314114 A1 Oct. 1, 2020

(30) Foreign Application Priority Data
Mar. 29, 2019 (DE) .......................... 102019204452.2

(51) Int. Cl.
*H04L 9/40* (2022.01)
(52) U.S. Cl.
CPC .................... *H04L 63/14* (2013.01)

(58) Field of Classification Search
None
See application file for complete search history.

(56) References Cited

U.S. PATENT DOCUMENTS

| 10,279,775 | B2 * | 5/2019 | Shah | H04L 9/0825 |
|---|---|---|---|---|
| 2013/0136007 | A1 * | 5/2013 | Jiang | H04L 41/0677 370/242 |
| 2018/0244238 | A1 * | 8/2018 | Shah | H04L 63/0876 |
| 2019/0193653 | A1 * | 6/2019 | Nakamura | G06F 1/24 |
| 2020/0183676 | A1 * | 6/2020 | Sakurai | H04W 4/44 |

FOREIGN PATENT DOCUMENTS

DE 102017210647 A1 12/2018

* cited by examiner

*Primary Examiner* — Kaveh Abrishamkar
(74) *Attorney, Agent, or Firm* — Norton Rose Fulbright US LLP; Gerard Messina

(57) ABSTRACT

A method for operating a control unit in a network of control units, including the following features: a request to change a mode of the network is received, the request is subjected to a check, which provides a check result; a communication is disseminated to the remaining control units and a response is received in each case with respect to the check result and to a status of the network known to the control unit; and the request is complied with or rejected as a function of the responses.

17 Claims, 5 Drawing Sheets

METHOD AND DEVICE FOR OPERATING A CONTROL UNIT IN A NETWORK OF CONTROL UNITS

RELATED APPLICATION INFORMATION

The present application claims priority to and the benefit of German patent application no. 10 2019 204 452.2, which was filed in Germany on Mar. 29, 2019, the disclosure which is incorporated herein by reference.

FIELD OF THE INVENTION

The present invention relates to a method for operating a control unit in a network of control units. The present invention also relates to a corresponding device, to a corresponding computer program, as well as to a corresponding machine-readable memory medium.

BACKGROUND INFORMATION

In IT security, any system for detecting intrusions directed against a computer system or computer network is referred to as an intrusion detection system, IDS. Network-based IDSs (NIDS), which record, analyze all packets in a network segment to be monitored and report suspicious activities based on known intrusion patterns are known in particular.

Patent document DE 10 2017 210 647 A1 discusses a method for detecting an intrusion in a field bus, characterized by the following features: a first message is received via the field bus; the first message is subjected to an integrity test; if the integrity test fails, the first message is rejected and a second message is generated; and the second message is sent via the field bus to an intrusion detection system.

SUMMARY OF THE INVENTION

The present invention provides a method for operating a control unit in a network of control units, a corresponding device, a corresponding computer program, as well as a corresponding memory medium according to the descriptions herein.

The approach according to the present invention is based on the finding that a modern vehicle is made up of many networked components, which together fulfill different vehicle functions. These vehicle functions may be active individually or also superimposed. For purposes of control, vehicle operating modes are defined for classifying operating states of the vehicle, for example, the driver drives, the vehicle travels autonomously or semi-autonomously using, for example, adaptive cruise control (ACC), etc. For this purpose, each functionally necessary component within the network must also assume the "correct" (higher level) state in order to fulfill the vehicle function as provided.

The method provided also takes into account the fact that such component states must be compatible with one another in a functional and safety-related manner. In conjunction with known safety concepts, safety mechanisms (limiters) are employed in components (for example, actuators) relevant to operational safety (safety), which limit the effect of an erroneous input variable. In order to be able to use convenience functions and a safety-relevant function within a vehicle architecture, scalable safety mechanisms of a type are used, which limit the effect in a functionally specific manner. For this purpose, the safety-relevant components are shifted into the correspondingly required operating state (hereinafter: mode) on the basis of their pieces of input information. The ability of the components to change modes makes an intrusion via individual components corrupted by an intruder possible via manipulation of the network signals. In this case, mode changes of individual components are triggered via the network signals in such a way that the safety mechanisms used are deactivated. This includes, for example, the enabling or disabling of scalable limiters of actuators or the switching of sensor operating states. In addition, multiple components may be shifted into an incompatible combination of operating states.

One benefit of the approach according to the present invention in view of this threat is that individual control units of the type provided are unable to change their configuration in a network without other control units of the network agreeing to the requested mode change.

Advantageous refinements of and improvements on the basic concept specified in the main description herein are possible with the measures cited in the further descriptions herein. Thus, it may be provided that the network communicates via a field bus of a motor vehicle that includes the control units and the check of the request to change the network mode takes into consideration the operating conditions to be complied with by the motor vehicle. In this way, a mode of the vehicle overriding the individual control units is practically created, which may not be changed by an individual component.

According to another aspect, it may be provided that the network includes defined modes corresponding to particular functions of the motor vehicle, the aforementioned check taking place based on reliable transitions between the modes. Control units encompassed by the network thus allow transitions only to compatible system configurations.

Exemplary embodiments of the present invention are depicted in the drawings and explained in greater detail in the following description.

DETAILED DESCRIPTION

A control unit, which may take the form of a separate hardware product or of a software process, not only changes its mode according to the present invention on the basis of an incoming message from the vehicle network, but also checks the plausibility of this message beforehand based on the status vectors of the other control units in the functional network. The control unit then changes its mode only if the functional configuration is valid.

As a prerequisite to the foregoing, the corresponding status information for each mode change is distributed into the vehicle network where it is synchronized. Thus, the status information of the driving mode is distributed and no longer drawn from one single source in the vehicle network.

Figure 1:
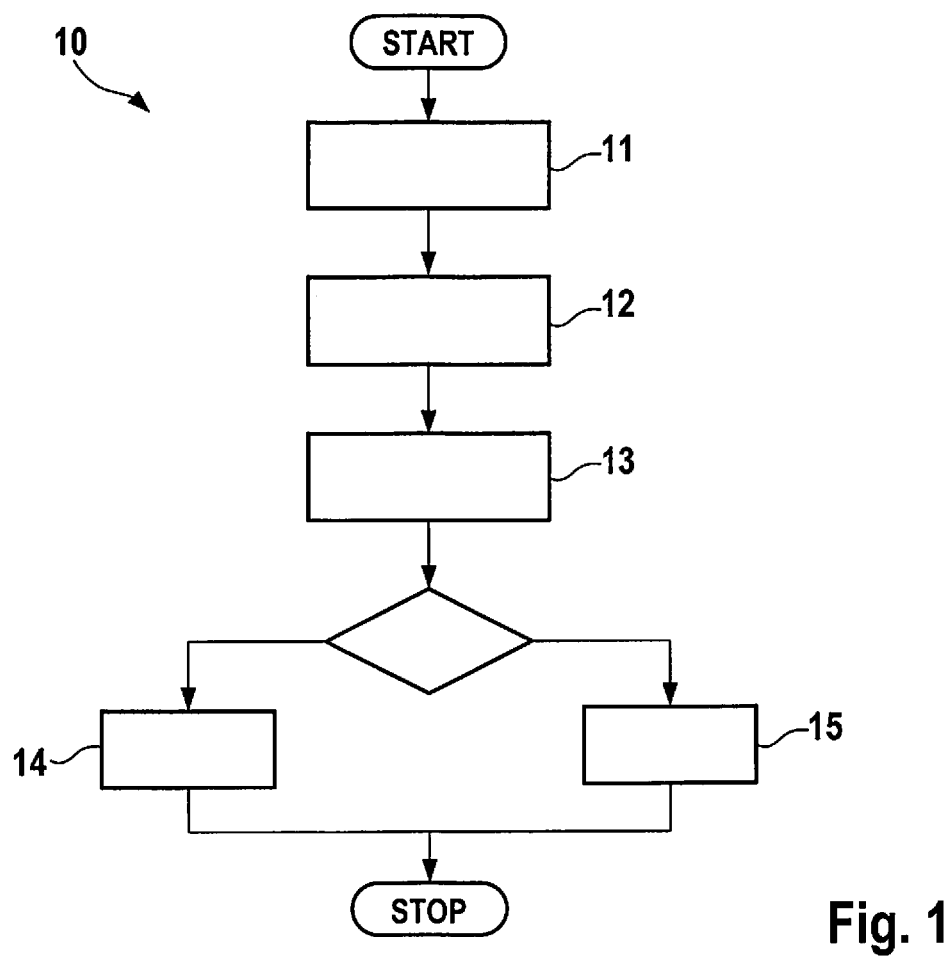
FIG. 1 shows a flow chart of a method according to a first specific embodiment.

A mode change takes place, as illustrated in FIG. 1, according to the following sequence: one control unit informs a control unit network defined by a functional configuration of the request for a mode change (process 11). Each control unit in the relevant control unit network checks the completeness of the request. Each control unit in the relevant control unit network further checks the integrity of the requested mode change (the configuration depicted in the table below and the transitions depicted in FIGS. 3, 4, 5) and boundary conditions with respect to compatibility with the functionality, i.e., whether the vehicle situation permits a safe change into the requested mode (process 12). The check (process 12) may also take place successively or in parts, in order in this way to enable specific error responses. Each control unit in the relevant control unit network notifies the other control units of the result of this check and its status in the state vector and receives corresponding responses (process 13). Finally, each control unit carries out the mode change (process 14) only if all control units agree and a valid system configuration is present or if—according to a Byzantine error model—a predefined minimum number of responses is positive and the requested mode permits a limited functionality with a subset of the control units joined in the network. The latter could, for example, be the case in the event of multiple redundant sensors.

In the event that not all control units in the network are able to check the completeness, integrity and authenticity of the request for a mode change, a variant of the present invention nevertheless remains applicable as long as at least one control unit is capable of this check. In this scenario, only the control units capable thereof carry out the respective check and notify the other control units of their results.

Figure 2:
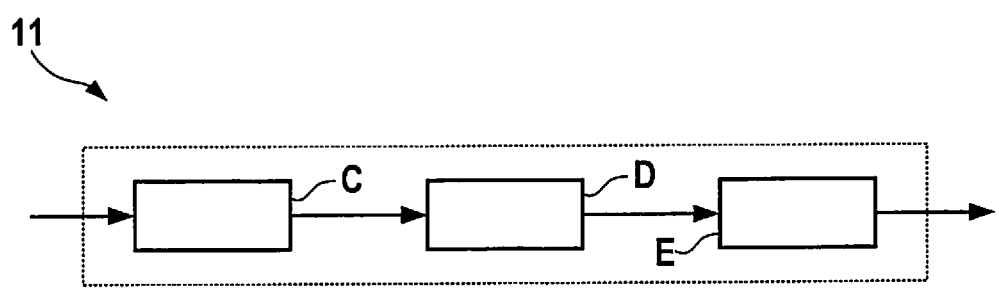
FIG. 2 shows the block diagram of a control chain.

FIG. 2 shows by way of example a network (11) made up of three components (C, D, E) including a potentially risky surroundings interaction. The system description represented in FIG. 2 is used in the following examples. A risk potential in this case originates directly from actuator (E) and indirectly from sensor (C) and controller (B). In this case, it is assumed that actuator (E) is able to limit the effect on the surroundings, depending on the state, to generally safe limiting values and the system is able to include in the decision the requisite boundary conditions such as speed, state of any anti-lock braking system (ABS), system errors and environmental influences for a configuration change.

Figure 3:
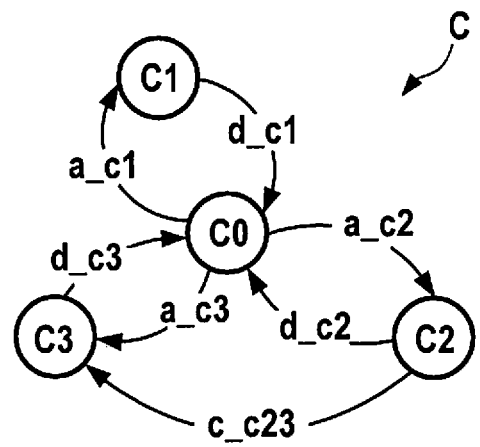
FIG. 3 shows the state transition diagram of a sensor.
Figure 4:
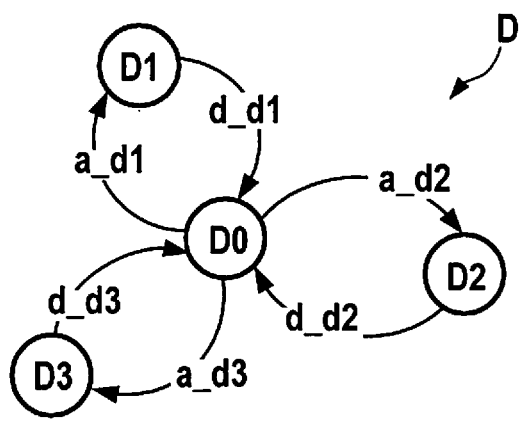
FIG. 4 shows the state transition diagram of a controller.
Figure 5:
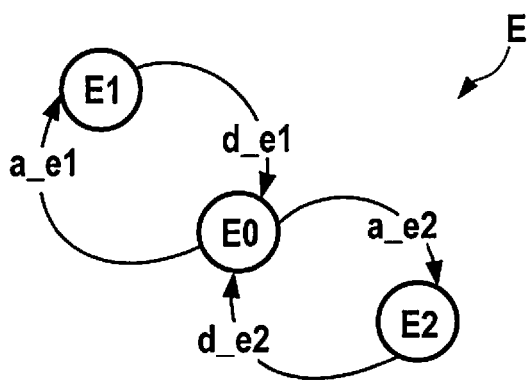
FIG. 5 shows the state transition diagram of an actuator.

Control units (C, D, E) in this case may be considered to be finite automatons, whose states (C0-C3, D0-D3, E0-E2) and admissible state transitions are illustrated in FIGS. 3, 4 and 5. The meaning of the modes of the network (11) resulting from the combination of these states may be derived from the following table:

| State of the sensor | State of the controller | State of the actuator | Meaning and risk classification |
|---|---|---|---|
| C0 | D0 | E0 | valid and safe initial state |
| C0 | D0 | E1 | disrupted convenience function |
| C0 | D0 | E2 | safety-critical |
| C0 | D1 | E0 | disrupted convenience function |
| C0 | D1 | E1 | disrupted convenience function |
| C0 | D1 | E2 | safety-critical |
| C0 | D2 | E0 | disrupted convenience function |
| C0 | D2 | E1 | disrupted convenience function |
| C0 | D2 | D2 | safety-critical |
| C0 | D3 | E0 | disrupted convenience function |
| C0 | D3 | E1 | disrupted convenience function |
| C0 | D3 | E2 | safety-critical |
| C1 | D0 | E0 | disrupted convenience function |
| C1 | D0 | E1 | disrupted convenience function |
| C1 | D0 | E2 | safety-critical |
| C1 | D1 | E0 | valid function 1 (driver information), partial configuration |
| C1 | D1 | E1 | disrupted convenience function |
| C1 | D1 | E2 | safety-critical |
| C1 | D2 | E0 | disrupted convenience function |
| C1 | D2 | E1 | disrupted convenience function |
| C1 | D2 | D2 | safety-critical |
| C1 | D3 | E0 | disrupted convenience function |
| C1 | D3 | E1 | disrupted convenience function |
| C1 | D3 | E2 | safety-critical |
| C2 | D0 | E0 | disrupted convenience function |
| C2 | D0 | E1 | disrupted convenience function |
| C2 | D0 | E2 | safety-critical |
| C2 | D1 | E0 | disrupted convenience function |
| C2 | D1 | E1 | disrupted convenience function |
| C2 | D1 | E2 | safety-critical |
| C2 | D2 | E0 | disrupted convenience function |
| C2 | D2 | E1 | valid function 2 (adaptive cruise control) |
| C2 | D2 | D2 | safety-critical |
| C2 | D3 | E0 | disrupted convenience function |
| C2 | D3 | E1 | disrupted convenience function |
| C2 | D3 | E2 | safety-critical |
| C3 | D0 | E0 | disrupted convenience function |
| C3 | D0 | E1 | disrupted convenience function |
| C3 | D0 | E2 | safety-critical |
| C3 | D1 | E0 | disrupted convenience function |
| C3 | D1 | E1 | disrupted convenience function |
| C3 | D1 | E2 | safety-critical |
| C3 | D2 | E0 | disrupted convenience function |
| C3 | D2 | E1 | disrupted convenience function |
| C3 | D2 | D2 | safety-critical |
| C3 | D3 | E0 | disrupted convenience function |
| C3 | D3 | E1 | disrupted convenience function |
| C3 | D3 | E2 | valid function 3 (traffic jam assistant) |

Figure 6:
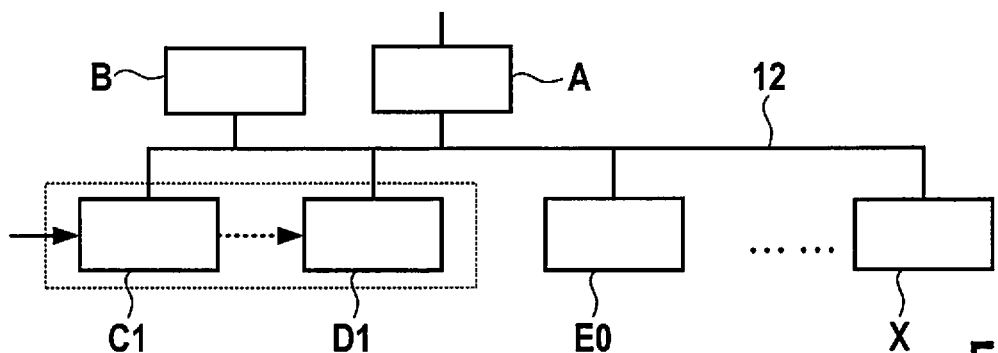
FIG. 6 shows the block diagram of a bus segment including the control chain in the "driver information system" mode.
Figure 7:
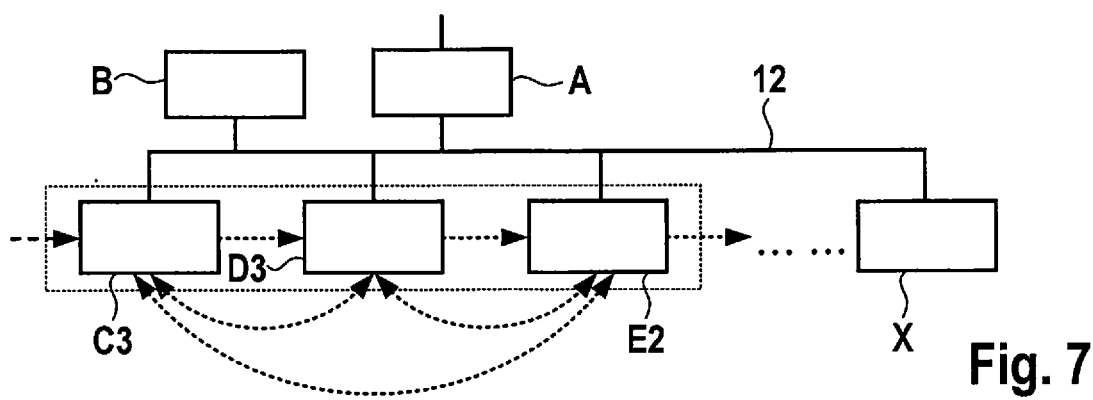
FIG. 7 shows the behavior during an admissible change in the "traffic jam assistant" mode.

FIG. 6 elucidates by way of example a bus segment encompassing this network, the network being initially in the "driver information system" mode. The behavior of the network when requesting the "traffic jam assistant," TJA mode is now explained with reference to FIG. 7. Each element (C, D, E) of the network in this case sends the requested individual request and the mode received by the remaining users in the form of a structure referred to below as a status vector to each other user. In the present example, the aforementioned users agree on the status vector (C3, D3, E2). An evaluation of the status vector carried out by each element (C, D, E) in connection with a misuse check reveals the validity of the status vector as well as the compliance with the boundary conditions. Each element (C, D, E) therefore declares the requested state transition as proper, notifies the other elements of the corresponding decision and carries out the configuration change.

Figure 8:
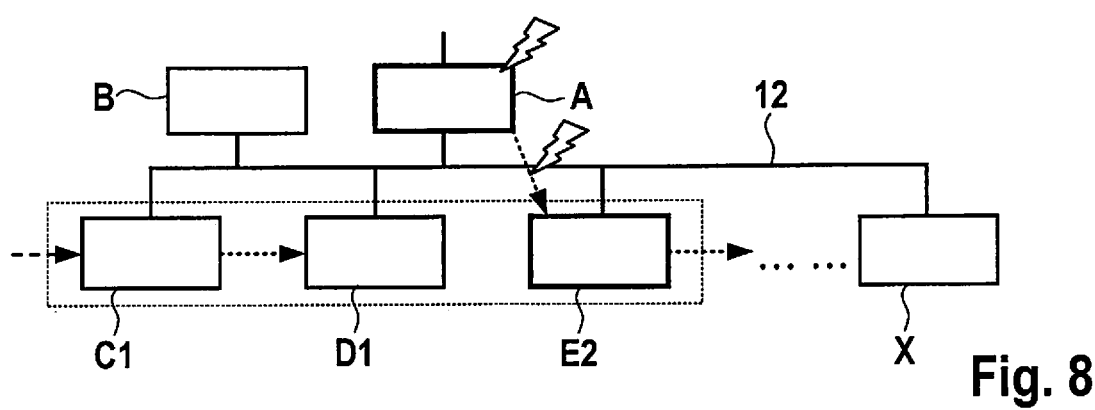
FIG. 8 shows a potentially dangerous behavior resulting from an intrusion via a gateway or a system interface.

FIG. 8 contrasts this behavior with no intrusion—again starting from the initial configuration according to FIG.

6—with a potentially dangerous behavior by an intrusion via a gateway (A) or via a system interface, in which the intruder successfully configures the traffic jam assistant interface into the invalid mode (C1, D1, E2) by shifting actuator (E) into mode E2.

Figure 9:
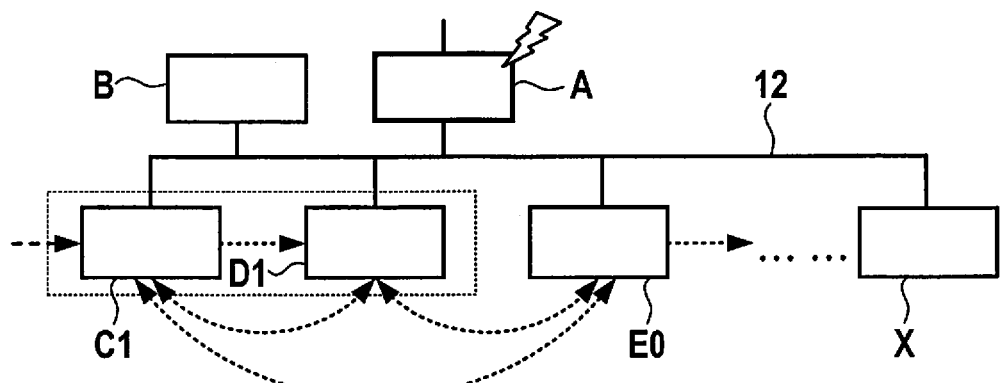
FIG. 9 shows the behavior during a detected intrusion via the gateway or system interface on an element and corresponding rejection of the state change.

Such an intrusion may be repelled according to the present invention, as is illustrated in FIG. 9: here there is agreement among all users about status vector (C1, D1, E2). An evaluation of the status vector carried out by each element (C, D, E) reveals the invalidity thereof as well as the compliance with the boundary conditions. Each element (C, D, E) thus declares the requested state transition to be improper, notifies the other elements of the corresponding decision and of the locally known status vector and rejects the requested state change. In the case of actuator (E), such a check of the state of the remaining TJA components could, for example, take place according to the following pseudo code:

If ( . . . AND(C!="C3" OR D!="D3")) then REJECT "E2".

An evaluation of partial configurations would reveal that (C1, D1) would correspond to a valid partial configuration of the driver information system, whereas the combinations C1/E2 as well as D1/E2 would be detected as invalid.

The corresponding behavior in the case of an intrusion via gateway (A) or a system interface in a complete configuration, in which the intruder attempts to shift the network into mode C3, D3, E2, may also be explained with reference to FIG. 9. Here, there is agreement among all users about status vector (C3, D3, E2). Each of users C, D, E checks the compliance of the boundary conditions, the admissibility of the status vector (table) and the admissibility of its transition goal (FIGS. 3, 4, 5). The users agree upon the admissibility of the status vector. The transition goals are detected by users C and D as inadmissible, since according to FIGS. 3, 4, no transitions from states C1, D1 into states C2, D2 are permitted. C, D inform the network of the inadmissibility of the requested mode change. The requested mode change subsequently does not take place and the vehicle remains in the safe initial state.

Due to the present invention, only the intrusions are successful which seek to shift the network into a state, which both fits the boundary conditions and which corresponds to the transition rules of the individual users and is detected by all users as admissible. All intrusions of this kind result in a safe state and thus constitute no threat to life and limb.

Figure 10:
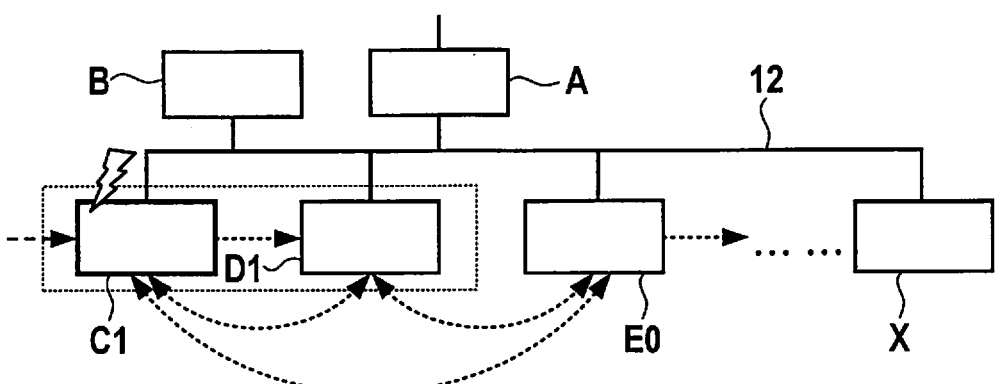
FIG. 10 shows the behavior during detection of a corrupted component based on a missing or invalid state vector and corresponding rejection of the state change.

FIG. 10 illustrates the behavior of the system in the case in which a corresponding instruction originates from sensor (C). The status vector thereof is missing in this case or is wrong. Both controller (B) as well as actuator (E) detect this error state based on the condition If (C!="C3" OR D!="D3" OR E!="E2").

It should be noted that a suitable asymmetrical cryptosystem should also be used in order to authenticate sensor (C, F, G) based on its public key.

Figure 11:
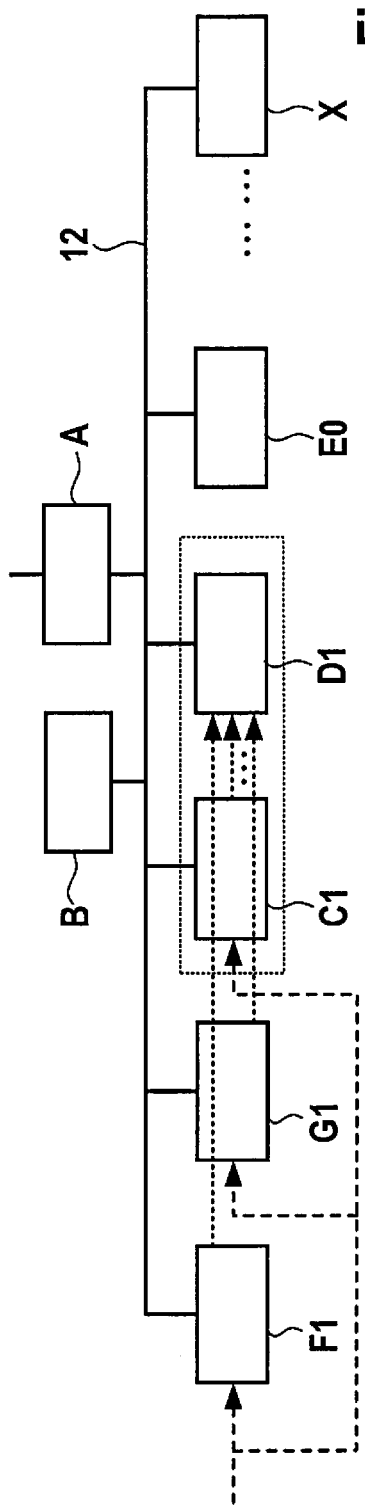
FIG. 11 shows the block diagram of a system including three or more sensors in the "driver information system" mode.
Figure 12:
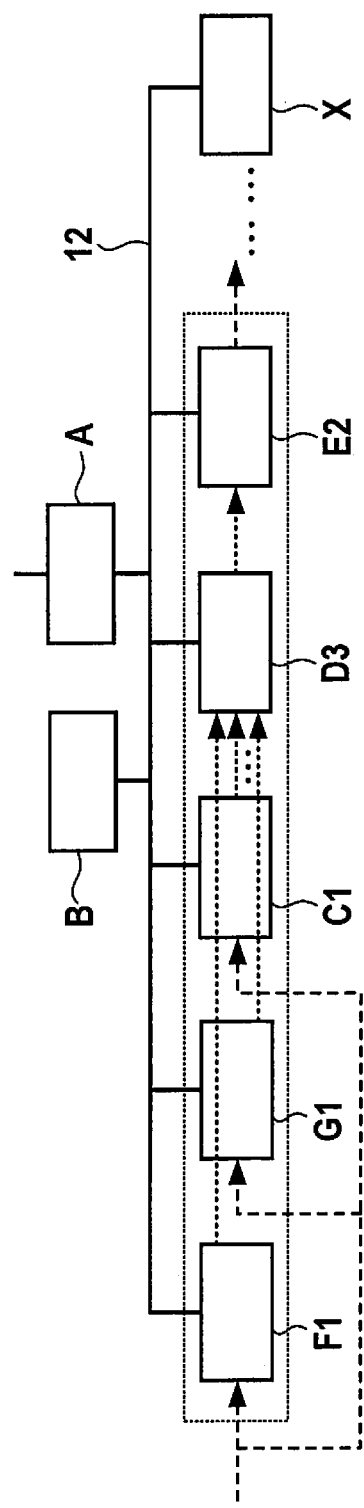
FIG. 12 shows the application of the Byzantine error model including majority decision-maker on the basis of the distributed state vectors.

FIG. 11 shows the block diagram of a system that includes three or more sensors (C, F, G) in the "driver information system" mode. In view of the number of control units (A-G, X) encompassed by the network, the Byzantine error model with majority decision-maker, starting from this configuration, is applicable on the basis of the distributed state vector—in the present case (F1, G1, C3, D3 E2), as illustrated in FIG. 12.

A traffic jam pilot (TJP) is now cited as a second exemplary embodiment. For the sake of simplicity, it is assumed that the system supports only the modes "manual control" and "automatic control." In the first case, the complete control over the vehicle remains with the driver and corresponding limiters permit complete steering freedom as well as the increase of speed up to the structurally determined maximum speed. In the latter case, the limiters reduce the freedoms to smaller steering angles and to a speed of 65 km/h. The limiter may be dynamic and changes depending on the ASIL classification of the mode.

It is further assumed that an intruder wishes to generate an accident and has already brought the control unit that does not control the steering under his control, with which he is able to send valid messages to the steering control unit. For example, the intruder wants to prompt the limiter in the automatic drive mode to permit maximum freedoms in terms of steering, since the steering angle normally limited in this mode is insufficient. The intruder is only able, however, to configure the limiter via signals and, for example, not able to directly write its memory.

Based on these assumptions, an intrusion opportunity would be to send a signal to the steering for changing the mode, so that the limiter adapts to a presumably manual driving mode, which permits complete steering freedom. However, since the mode is known to all control units as a result of the status vectors exchanged according to the present invention, it cannot be readily changed; instead, multiple control units—based on their sensor evaluation—would have to virtually "agree" to the mode change requested by the intruder. The request of the intruder for a mode change would therefore be rejected by the system according to the present invention (process 15—FIG. 1).

This method (10) may be implemented, for example, in software or in hardware or in a mixed form of software and hardware, for example, in one of control units (A-G-X).

What is claimed is:

1. A method for operating a control unit in a network of control units, the method comprising:
    receiving a request to change a mode of the network to a requested mode, wherein the network is an automotive network;
    disseminating a communication, to the remaining control units of the network, which informs the remaining control units of the request, wherein each of the control units of the network respectively checks the request and validity of the requested mode change, and a response is received from each of the remaining control units with respect to a result of the respective check, wherein each respective check includes checking whether a combination of respective states for the control units of the network, for the requested mode, is a valid combination; and
    as a function of the responses, complying with the request for the mode change to the requested mode or rejecting the request for the mode change to the requested mode.

2. The method of claim 1, wherein the request is complied with if one of the following is satisfied: (i) the responses are all positive and the control unit considers the requested mode to be valid, or (ii) if a predefined minimum number of the responses is positive and the requested mode permits a limited functionality.

3. The method of claim 1, wherein at least one of the following is satisfied:
    the check of the request relates to a completeness of the request,
    the check of the request relates to an integrity of the request, and/or
    the check of the request relates to an authenticity of the request.

4. The method of claim 1, wherein the network is configured to communicate via a field bus of a motor vehicle that includes the control units, and wherein the check takes operating conditions to be complied with by the motor vehicle into consideration.

5. The method of claim 4, wherein at least one of the following is satisfied:
the control unit includes a gateway of the field bus,
the control unit is configured to control a sensor of the motor vehicle,
the control unit includes a controller of the field bus, and/or
the control unit is configured to control an actuator of the motor vehicle.

6. The method of claim 4, wherein at least one of the following is satisfied:
the control unit includes a gateway of the field bus,
the control unit is configured to control a sensor of the motor vehicle,
the control unit is configured to control a functionality via control flows or data flow, and/or
the control unit is configured to control an actuator of the motor vehicle.

7. The method of claim 4, wherein the network has multiple modes, which include the requested mode and which correspond to functions of the motor vehicle, and wherein the check takes place based on predefined transitions between the modes.

8. The method of claim 7, wherein at least one of the following is satisfied:
the functions include an adaptive cruise control,
the functions include a driver information system,
the functions include a traffic jam assistant, and/or
the functions include a traffic jam pilot.

9. The method as recited in claim 1, wherein each respective check includes checking, by the respective control unit, whether the respective state for the respective control unit in the combination is admissible taking into consideration a current state of the respective control unit.

10. The method as recited in claim 1, wherein for the checking of the combination of respective states of the control units of the network, for the requested mode, each control unit checks a state vector representing the respective states of the control units for the requested mode.

11. A non-transitory computer readable medium having a computer program, which is executable by a processor, the computer program including
program code for operating a control unit in a network of control units, the program code, when executed by the processor, causing the processor to perform the following:
receiving a request to change a mode of the network, wherein the network is an automotive network;
disseminating a communication to the remaining control units of the network, which informs the remaining control units of the request, wherein each of the control units of the network respectively checks the request and validity of the requested mode change, and a response is received from each of the remaining control units with respect to a result of the respective check, wherein each respective check includes checking whether a combination of respective states for the control units of the network, for the requested mode, is a valid combination; and
as a function of the responses, complying with the request for the mode change to the requested mode or rejecting the request for the mode change to the requested mode.

12. The computer readable medium of claim 11, wherein the request is complied with if one of the following is satisfied: (i) the responses are all positive and the control unit considers the requested mode to be valid, or (ii) if a predefined minimum number of the responses is positive and the requested mode permits a limited functionality.

13. The non-transitory computer readable medium as recited in claim 11, wherein each respective check includes checking, by the respective control unit, whether the respective state for the respective control unit in the combination is admissible taking into consideration a current state of the respective control unit.

14. The non-transitory computer readable medium as recited in claim 11, wherein for the checking of the combination of respective states of the control units of the network, for the requested mode, each control unit checks a state vector representing the respective states of the control units for the requested mode.

15. A device, comprising:
a non-transitory computer readable medium having a computer program, which is executable by a processor, including a program code arrangement having program code for operating a control unit in a network of control units, the program code, when executed by the processor, causing the processor to perform the following:
receiving a request to change a mode of the network, wherein the network is an automotive network;
disseminating a communication to the remaining control units of the network, which informs the remaining control units of the request, wherein each of the control units of the network respectively checks the request and validity of the requested mode change, and a response is received from each of the remaining control units with respect to a result of the respective check, wherein each respective check includes checking whether a combination of respective states for the control units of the network, for the requested mode, is a valid combination; and
as a function of the responses, complying with the request for the mode change to the requested mode or rejecting the request for the mode change to the requested mode.

16. The device as recited in claim 15, wherein each respective check includes checking, by the respective control unit, whether the respective state for the respective control unit in the combination is admissible taking into consideration a current state of the respective control unit.

17. The device as recited in claim 15, wherein for the checking of the combination of respective states of the control units of the network, for the requested mode, each control unit checks a state vector representing the respective states of the control units for the requested mode.

* * * * *